(12) United States Patent
Fortin et al.

(10) Patent No.: US 9,150,165 B1
(45) Date of Patent: Oct. 6, 2015

(54) VEHICLE CAMERA ASSEMBLY

(71) Applicant: Nissan North America, Inc., Franklin, TN (US)

(72) Inventors: Hugo Fortin, Commerce Township, MI (US); Juan Balleza, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/549,947

(22) Filed: Nov. 21, 2014

(51) Int. Cl.
*B60R 11/04* (2006.01)

(52) U.S. Cl.
CPC ........................................ *B60R 11/04* (2013.01)

(58) Field of Classification Search
CPC ......................................................... B06R 11/04
See application file for complete search history.

(56) References Cited

U.S. PATENT DOCUMENTS

| | | | |
|---|---|---|---|
| 8,243,137 B2 | 8/2012 | Schuetz | |
| 8,698,894 B2 | 4/2014 | Briggance | |
| 2012/0230664 A1* | 9/2012 | Pavithran et al. | 396/89 |
| 2012/0327234 A1* | 12/2012 | Fish et al. | 348/148 |
| 2013/0107046 A1* | 5/2013 | Forgue | 348/148 |
| 2013/0215271 A1 | 8/2013 | Lu | |
| 2014/0218534 A1 | 8/2014 | Briggance | |

FOREIGN PATENT DOCUMENTS

| | | |
|---|---|---|
| JP | 2005-199837 A | 7/2005 |
| JP | 2010-69989 A | 4/2010 |
| JP | 5186866 B2 | 4/2013 |
| WO | 2013-116277 A1 | 8/2013 |

* cited by examiner

*Primary Examiner* — Clayton E Laballe
*Assistant Examiner* — Noam Reisner
(74) *Attorney, Agent, or Firm* — Global IP Counselors, LLP

(57) ABSTRACT

A vehicle camera assembly includes a pedestal, a bracket, a camera and an emblem. The pedestal has an interior surface and an exterior surface with a lens receiving opening extending from the interior surface to the exterior surface. The interior surface includes a bracket attachment structure having at least one projection extending from the interior surface such that a recess is defined between a portion of the interior surface and the at least one projection. The bracket is attached to the bracket attachment structure with one edge of the bracket being retained within the recess. The camera is retained between the bracket and the pedestal. The camera has a lens portion that is aligned with the lens receiving opening of the pedestal. The emblem is attached to the exterior surface of the pedestal and is spaced apart from the lens receiving opening.

20 Claims, 10 Drawing Sheets

VEHICLE CAMERA ASSEMBLY

BACKGROUND

1. Field of the Invention

The present invention generally relates to a vehicle camera assembly. More specifically, the present invention relates to a vehicle camera assembly that includes a bracket, a pedestal and a camera where the bracket supports the camera and the bracket is retained within a recess of the pedestal.

2. Background Information

Vehicles are provided with cameras in order to assist a vehicle operator in certain maneuvers such as parking in confined area or backing up. Some vehicles include sophisticated camera and image display systems that require precise positioning of the cameras relative to specific surfaces of the vehicle within predetermined tolerances.

SUMMARY

One object of the disclosure is to provide a vehicle with a camera assembly that can be precisely positioned on an exterior surface of the vehicle within predetermined tolerances.

Another object of the disclosure is to provide a camera assembly that includes at least one blind fastening structure.

Another object of the disclosure is to provide a camera assembly with a vehicle emblem pedestal that retains a camera mounting bracket, where the pedestal includes a first vehicle attachment structure and the camera mounting bracket includes a second vehicle attachment structure.

In view of the state of the known technology, one aspect of the disclosure has a vehicle camera assembly including a pedestal, a bracket, a camera and an emblem. The pedestal has an interior surface and an exterior surface with a lens receiving opening extending from the interior surface to the exterior surface. The interior surface includes a bracket attachment structure having at least one projection extending from the interior surface such that a recess is defined between a portion of the interior surface and the at least one projection. The bracket is attached to the bracket attachment structure with one edge of the bracket being retained within the recess. The camera is retained between the bracket and the pedestal. The camera has a lens portion that is aligned with the lens receiving opening of the pedestal. The emblem is attached to the exterior surface of the pedestal and is spaced apart from the lens receiving opening

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
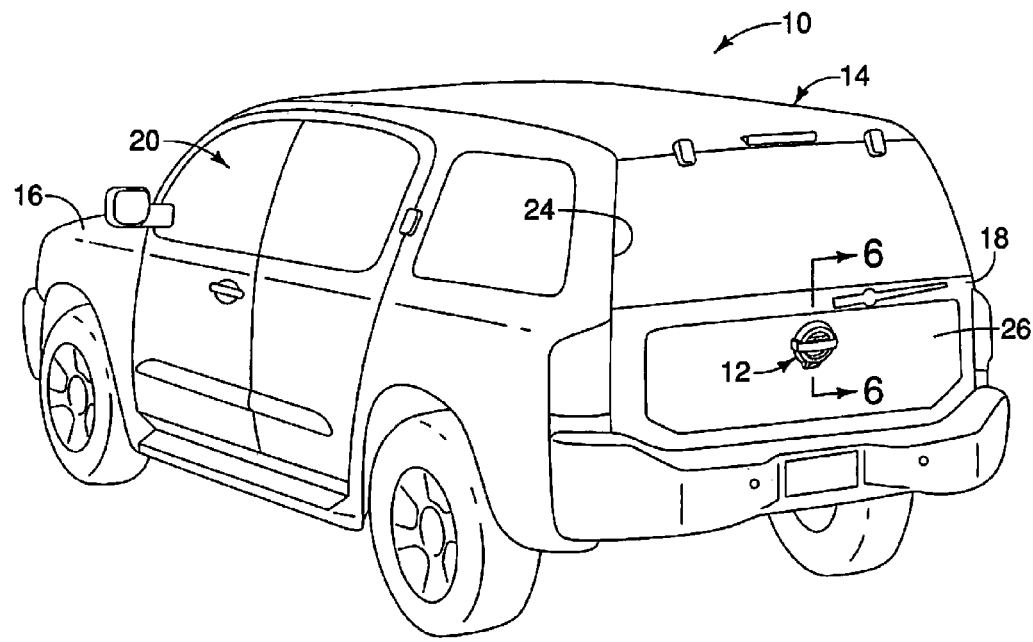
FIG. 1 is a perspective view of a vehicle showing a rear door with a camera assembly installed thereto in accordance with a first embodiment.
Figure 2:
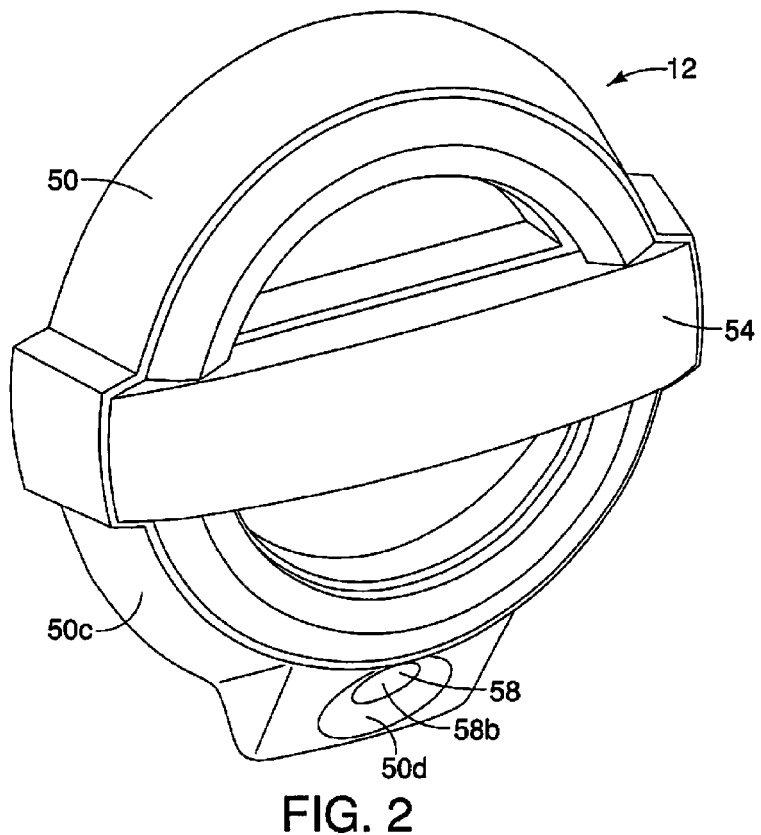
FIG. 2 is a perspective view of the camera assembly shown removed from the rear door of the vehicle in accordance with the first embodiment.

Referring initially to FIG. 1, a vehicle 10 with a camera assembly 12 (FIGS. 1 and 2) is illustrated in accordance with a first embodiment. A description of the camera assembly 12 is provided below after a brief description of related areas of the vehicle 10.

The vehicle 10 basically includes the camera assembly 12 mounted to a body structure 14 having a front end 16 and a rear end 18 that collectively defines a passenger compartment 20. The passenger compartment 16 is equipped with a video display (not shown) that is provided with images captured by the camera assembly 12, and optionally, other camera assemblies (not shown). The images captured by the camera assembly 12 are processed by a controller (not shown) which processes the captured images and displays them on the video display (not shown) within the passenger compartment 20 for use by a vehicle operator. Such image processing systems are known and fully described in, for example, U.S. Patent Application Publication No. 2010/0238051, published Sep. 23, 2010 (application Ser. No. 12/680,423), U.S. Patent Application Publication No. 2012/0069182, published Mar. 22, 2012 (application Ser. No. 13/232,146), and U.S. Pat. No. 8,243,994, issued Aug. 14, 2012 (application Ser. No. 12/298,837) all commonly assigned to Nissan Motor Co. Ltd. The disclosures of U.S. Patent Application Publication No. 2010/0238051, U.S. Patent Application Publication No. 2012/0069182, and U.S. Pat. No. 8,243,994 are incorporated herein by reference in their entirety. The camera assembly 12 can be used with and/or be part of any of the above disclosed video processing systems.

The camera assembly 12 can be installed at the front end 16 or the rear end 18 of the vehicle 10. The body structure 14 at the front end 16 differs from that at the rear end 18. However, installation can be similar or the same at the front end 16 and the rear end 18. Therefore, only the rear end 18 of the vehicle 10 is described for the sake of brevity.

The rear end 18 of the vehicle includes a rear opening 24 with a rear door 26 that is movable between an open orientation (not shown) and a closed orientation (FIG. 1).

Figure 3:
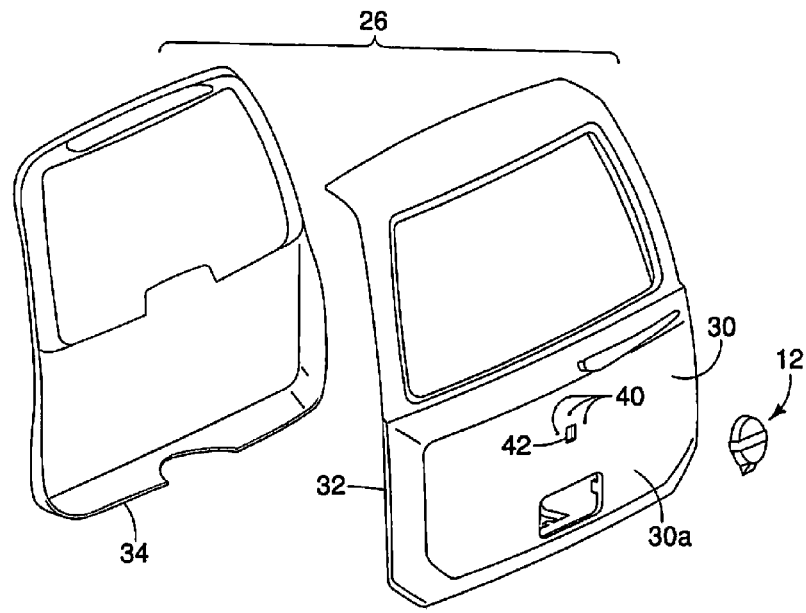
FIG. 3 is an exploded perspective view of an exterior side of the rear door of the vehicle showing various panels of the rear door, the camera assembly, and apertures that define a fastening structure for the camera assembly in accordance with the first embodiment.
Figure 4:
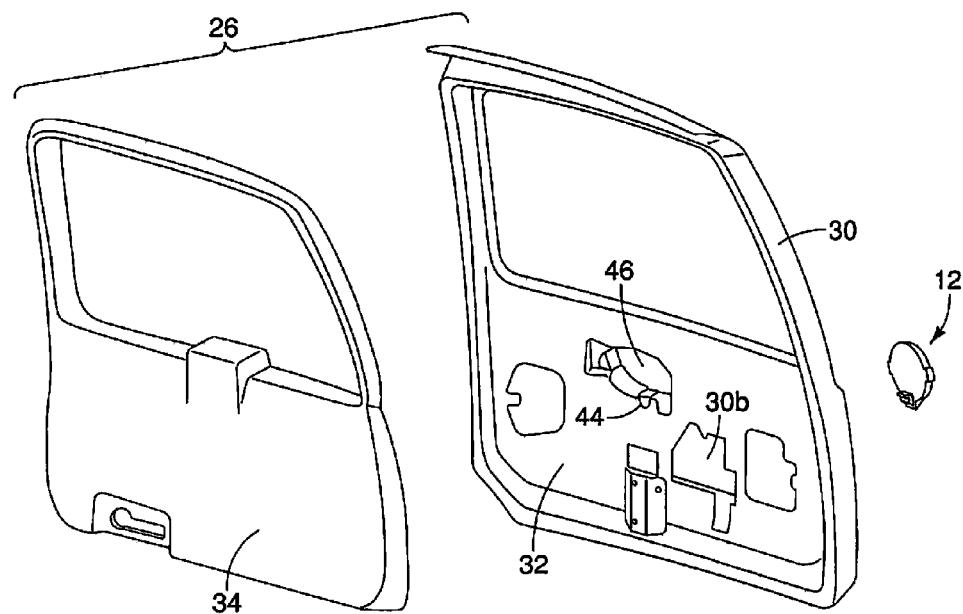
FIG. 4 is an exploded perspective view of an interior side of the rear door of the vehicle showing the various panels of the rear door and the camera assembly in accordance with the first embodiment.

FIGS. 3 and 4 show the rear door 26 removed from the vehicle 10. The rear door 28 basically includes an outer main panel 30, an inner main panel 32 (FIG. 4) and a trim panel 34. The outer main panel 30 and the inner main panel 32 are welded together in conventional manner. The trim panel 34 attaches to the inner main panel 32 via snap fitting projections or mechanical fasteners (not shown) in a conventional manner.

As shown in FIG. 3, the outer main panel 30 includes a plurality of attachment apertures 40 that are located in a central section of the outer main panel 30. The attachment apertures 40 extend from an outer surface 30a to an inner surface 30b of the outer main panel 30. The outer panel 30 also includes a camera cable opening 42 beneath the plurality of attachment apertures 40. The camera cable opening 42 also extends from the outer surface 30a to the inner surface 30b of the outer main panel 30. The attachment apertures 40 are located to receive fasteners that attach the camera assembly 12 to an outer surface of the outer main panel 30. As is described further below, the attachment apertures 40 define both a pedestal fastening structure and a bracket fastening structure.

Figure 5:
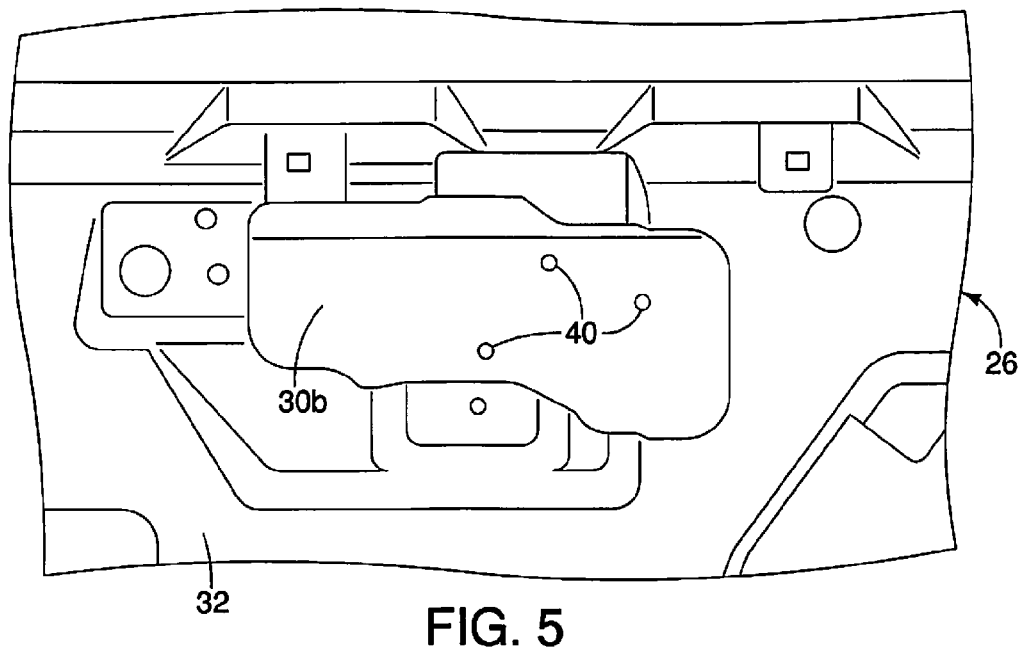
FIG. 5 is a view of the interior side of the rear door showing an irregularly shaped opening in the rear door provided to accommodate installation of the camera assembly in accordance with the first embodiment.

As shown in FIGS. 4 and 5, the inner main panel 32 includes at least one irregular opening 44. As shown in FIG. 4, a rear windshield wiper motor assembly 46 is installed to the inner main panel 32 and at least partially covers the irregular opening 44. As shown in FIG. 5 with the windshield wiper motor assembly 46 removed, the irregular opening 44 exposes several of the attachment apertures 40 in the outer main panel 30.

A description of the camera assembly 12 is now provided with specific reference to FIGS. 2 and 7-19. The camera assembly 12 basically includes a pedestal 50, a bracket 52, an emblem 54, a seal 56 and a camera 58.

Figure 9:
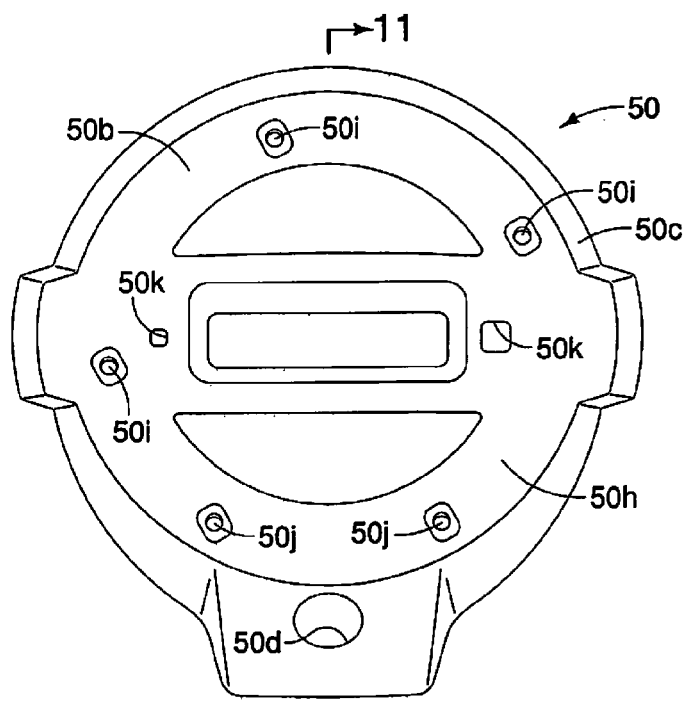
FIG. 9 is an elevational view of an exterior surface of the pedestal shown removed from the camera assembly in accordance with the first embodiment.
Figure 11:
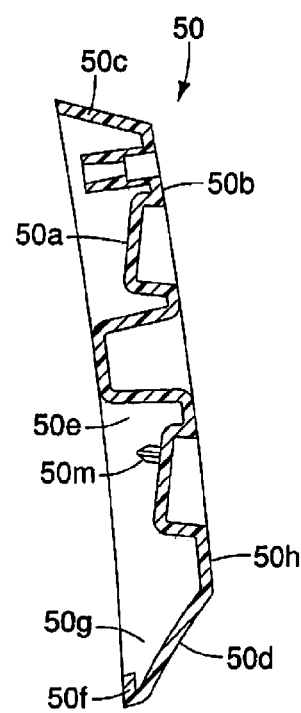
FIG. 11 is a cross-sectional view of the pedestal taken along the line 11-11 in FIG. 9 in accordance with the first embodiment.
Figure 10:
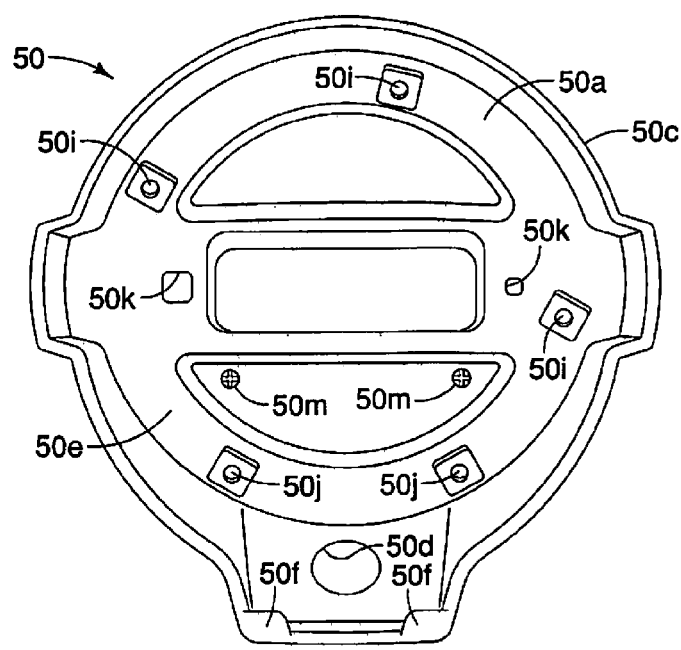
FIG. 10 is an elevational view of an interior surface of the pedestal shown removed from the camera assembly in accordance with the first embodiment.
Figure 12:
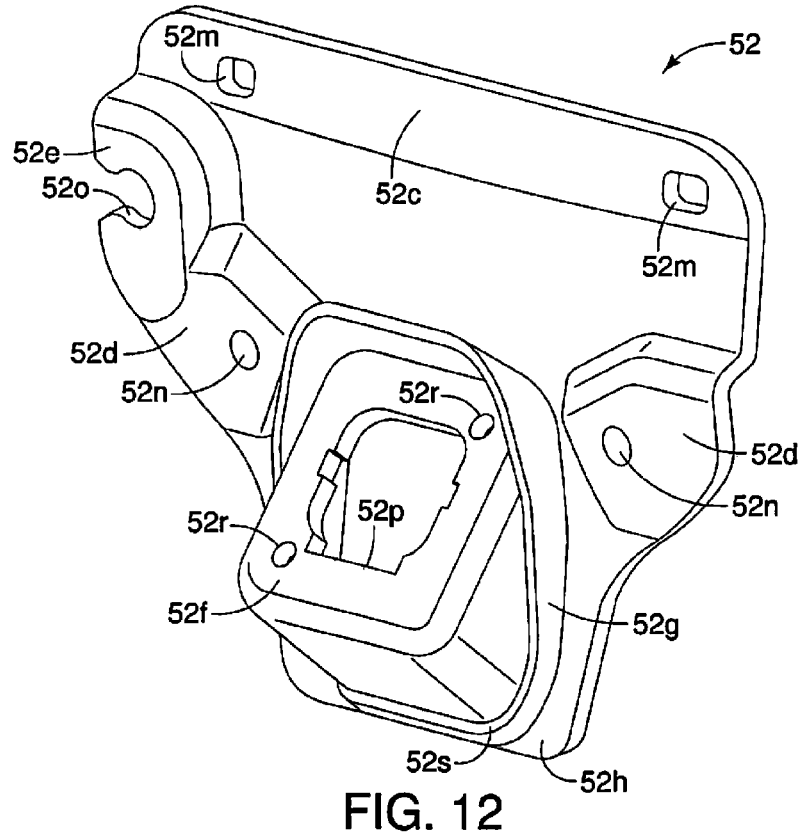
FIG. 12 is a perspective view of the bracket shown removed from the camera assembly in accordance with the first embodiment.
Figure 13:
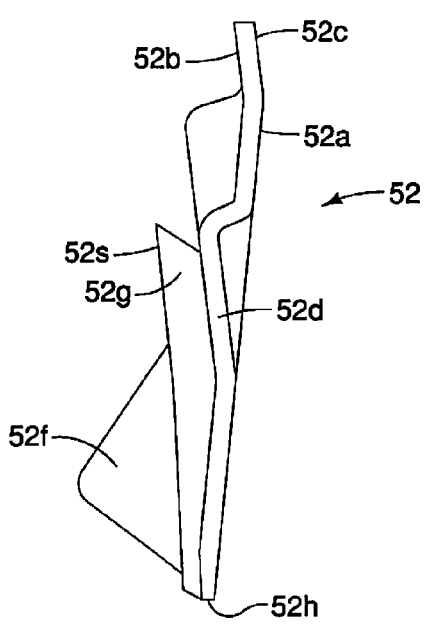
FIG. 13 is a side view of the bracket shown removed from the camera assembly in accordance with the first embodiment.
Figure 14:
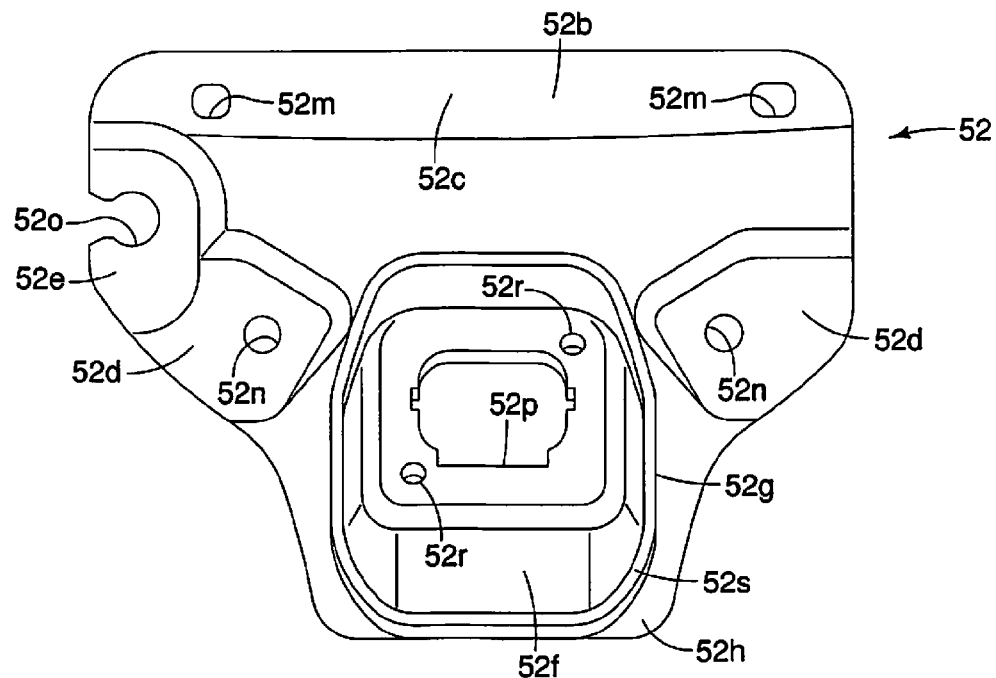
FIG. 14 is an elevational view of a first side of the bracket shown removed from the camera assembly in accordance with the first embodiment.

The pedestal 50 is shown removed from the camera assembly 12 in FIGS. 9-11. The pedestal 50 is made of a plastic or polymer material but can alternatively be made of a metal material. The pedestal 50 has an interior surface 50a, an exterior surface 50b and a lip 50c that extends around an outer perimeter of the pedestal 50. A lower section of the pedestal 50 includes a lens receiving opening 50d that extends from the interior surface 50a to the exterior surface 50b. As shown in FIG. 11, the exterior surface 50b has an overall convex shape. The interior surface 50a and the lip 50c define an overall concave area 50e. The interior surface 50a includes a pair of projections 50f that extend upward from a lower edge of the lip 50c such that a recess 50g is defined between a portion of the interior surface 50a and the projections 50f within the overall concave area 50e. The recess 50g basically defines part of a bracket attachment structure configured to retain the bracket 52, as described in greater detail below.

The exterior surface 50b of the pedestal 50 is shaped to include a decorative annular ring portion 50h, as shown in FIG. 9. The annular ring portion 50h includes a plurality of openings 50i and 50j that extend from the exterior surface 50b to the interior surface 50a. The plurality of openings 50i at least partially define a vehicle fastening structure that receives fasteners $F_1$ (FIGS. 7 and 8) that attach the pedestal 50 to the attachment apertures 40 (pedestal fastening structure) of the rear door 26 of the vehicle 10. The plurality of openings 50j further defines the bracket attachment structure. Specifically, the openings 50j receive fasteners $F_1$ (FIGS. 7 and 8) that fix the bracket 52 to the pedestal 50 along with the recess 50g, as described in greater detail below. The pedestal 50 also includes openings 50k that provide attachments apertures for the emblem 54. The interior surface 50a of the pedestal 50 also includes two alignment posts 50m, shown in FIGS. 10, 18 and 19.

The bracket 52 is shown removed from the camera assembly 12 in FIGS. 12-15. The bracket 52 can be made of metal material, but can alternatively be made of a rigid plastic or polymer material. The bracket 52 is basically a flat plate member that is shaped to include the depicted features described below. Specifically, the bracket 52 includes a first surface 52a and a second surface 52b opposite the first surface 52a. The bracket 52 further includes an upper flange portion 52c, side flange portions 52d, a fastener attachment portion 52e, a camera attachment portion 52f, a seal lip 52g that encircles the camera attachment portion 52f, and a lower flange portion 52h.

Figure 15:
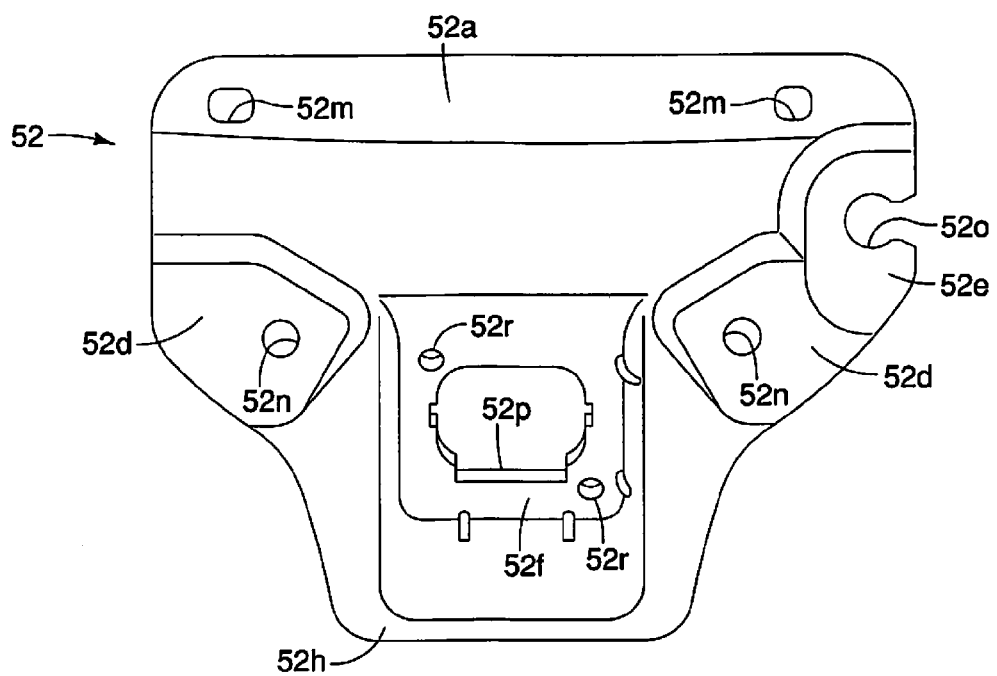
FIG. 15 is an elevational view of a second side of the bracket shown removed from the camera assembly in accordance with the first embodiment.
Figure 16:
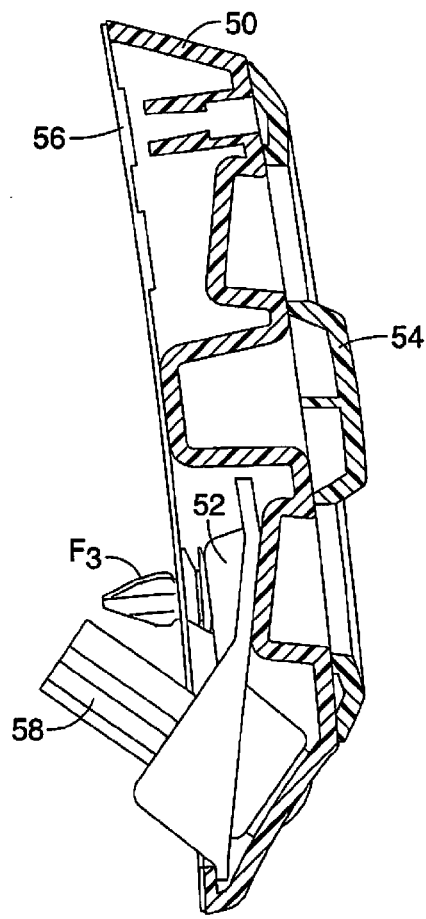
FIG. 16 is a cross-sectional side view of the camera assembly showing the camera attached to the bracket and the bracket installed to the interior surface of the pedestal in accordance with the first embodiment.
Figure 17:
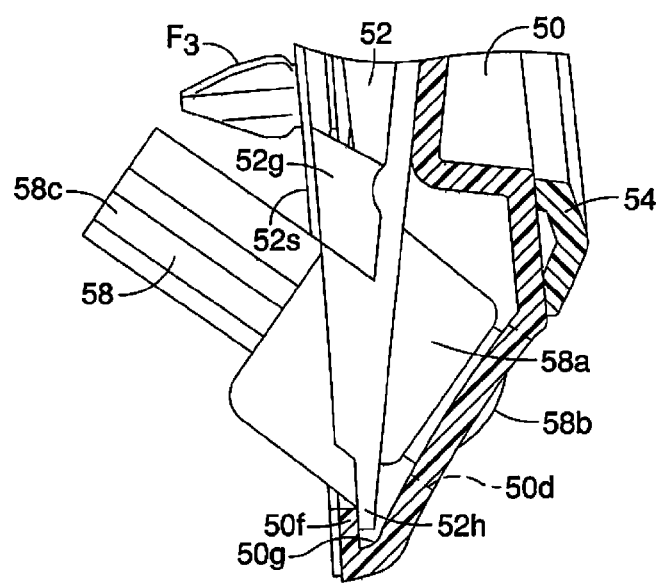
FIG. 17 is another cross-sectional side view of the lower portion of the camera assembly showing the camera attached to the bracket and the bracket installed to the interior surface of the pedestal with a lower edge of the bracket inserted into a recess formed within the pedestal in accordance with the first embodiment.
Figure 18:
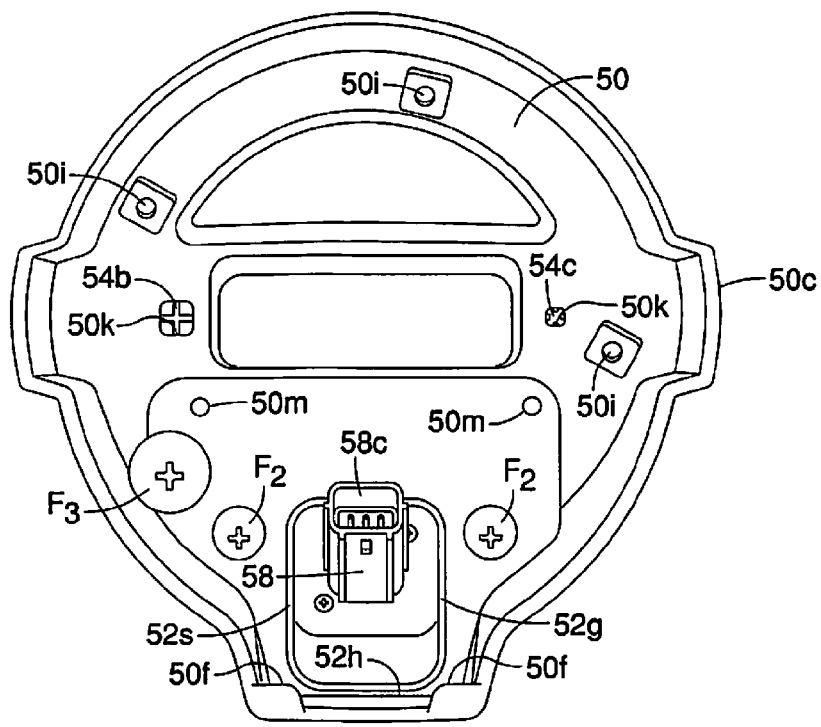
FIG. 18 is an elevational view of the camera assembly with the seal removed showing the camera attached to the bracket and the bracket installed to the interior surface of the pedestal in accordance with the first embodiment.
Figure 19:
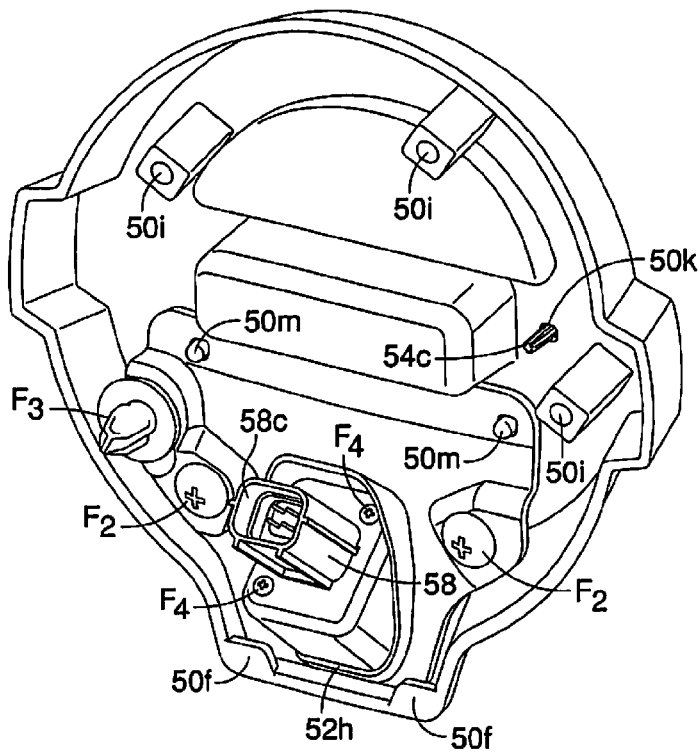
FIG. 19 is a perspective view of the camera assembly with the seal removed showing the camera attached to the bracket and the bracket installed to the interior surface of the pedestal in accordance with the first embodiment.

The upper flange portion 52c of the bracket 52 includes alignment openings 52m located to receive the alignment posts 50m of the pedestal 50 upon installation of the bracket 52 to the pedestal 50. The side flange portions 52d each include an opening 52n. The openings 52n are located to align with the openings 50j of the pedestal 50 and receive the fasteners $F_2$ (FIG. 8) upon installation of the bracket 52 to the pedestal 50. A fastener attachment portion 52e includes a slot 52o that is part of a doghouse that is configured to receive and retain a snap-fitting fastener $F_3$ shown in FIGS. 8 and 16-19. The camera attachment portion 52f includes a camera receiving opening 52p and fastener openings 52r. As shown in FIGS. 18 and 19, the camera receiving opening 52p receives a portion of the camera 58 and fasteners $F_4$ are inserted through the fastener openings 52r engaging the camera 58 and fixing the camera 58 to the camera attachment portion 52f of the bracket 52. As shown in FIG. 15, along the first surface 52a of the bracket 52, the camera attachment portion 52f is concaved. Consequently, a portion of the camera 58 is retained within the concaved area of the camera attachment portion 52f, as shown in FIGS. 16 and 17.

The seal lip 52g extends around the camera attachment portion 52f and encircles the camera attachment portion 52f. A peripheral edge 52s of the seal lip 52g is shaped and dimensioned such that, with the bracket 52 installed to the pedestal 50, the peripheral edge 52s aligns with a plane defined by the peripheral edge of the lip 50c of the pedestal 50. The peripheral edge of the lip 50c of the pedestal 50 and the peripheral edge 52s of the seal lip 52g are therefore co-planar and contact the seal 56 with the camera assembly 12 installed to the outer surface 30a of the rear door 26.

The lower flange portion 52h is dimensioned and configured to insert and be retained within the recess 50g of the pedestal 50, between the projections 50f and the interior surface 50a of the pedestal 50, as shown in FIGS. 16-19. The lower flange portion 52h is an edge of the bracket 52 that is retained within the recess 50g of the pedestal 50 once the bracket 52 is installed to the pedestal 50.

The emblem 54 is a decorative circular shaped element with a central section that includes a logo, such as the name of the manufacturer. The emblem 54 includes a decorative outer surface 54a and an attachment surface (not visible) that includes two projections 54b and 54c that are visible in FIG. 18 extending through the openings 50k of the pedestal 50. Specifically, the projections 54b and 54c are inserted into the openings 50k and press-fitted into engagement there with such that the emblem 54 is attached to the exterior surface 50b of the pedestal 50. However, as is indicated in FIGS. 16 and 17, the emblem 54 is spaced apart from the lens receiving opening 50d of the pedestal 50.

Figure 8:
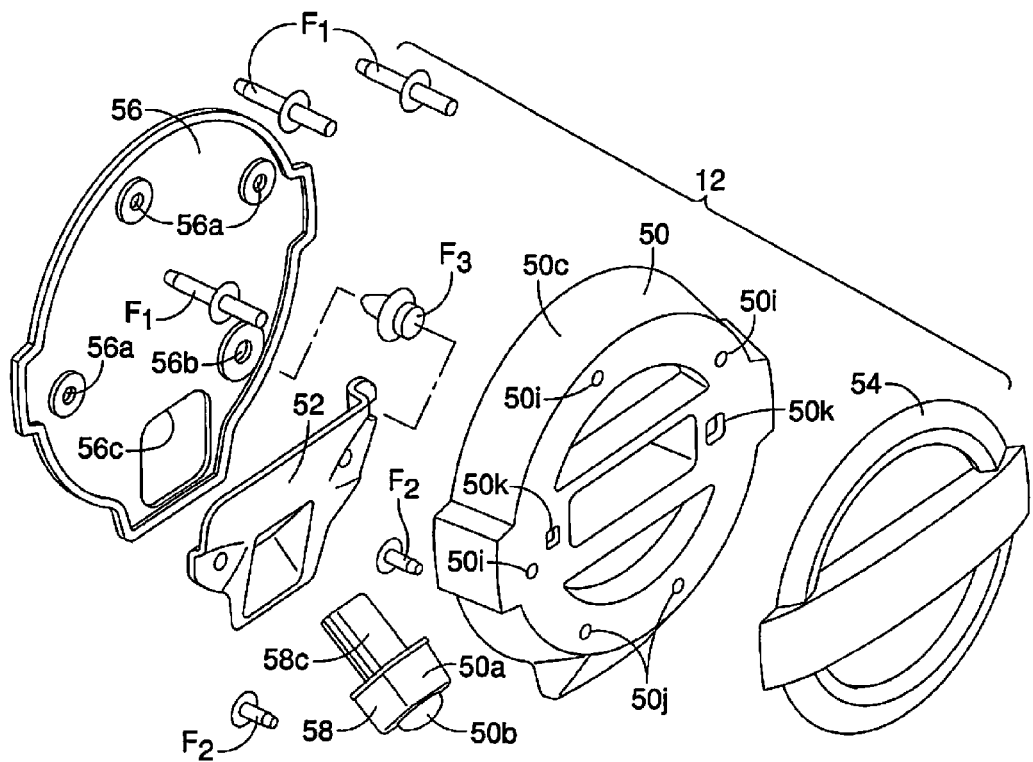
FIG. 8 is an exploded view of the camera assembly removed from the vehicle showing a seal, a bracket, a camera, a pedestal and an emblem in accordance with the first embodiment.

The seal 56 is made of a compressible material, such as rubber or flexible plastic. As shown in FIG. 8, the seal 56 has an overall circular or disk shape with outwardly extending protrusions that correspond to the overall shape of the lip 50c of the pedestal 50. The seal 56 has a plurality of first fastener openings 56a, a second fastener opening 56b and a camera opening 56c. The first fastener openings 56a are spaced apart from one another and deliberately positioned relative to one another and to the pedestal 50 to align with and receive the fasteners $F_1$ with the pedestal 50 and the seal 56 installed to the rear door 26 of the vehicle 10. The second fastener opening 56b is spaced apart from the first fastener openings 56a and positioned to align with and receive the snap-fitting fastener $F_3$ with the snap-fitting fastener $F_3$ installed to the slot 52o of the bracket 52, and the bracket 52 installed to the pedestal 50. The camera opening 56c is spaced apart from the first fastener openings 56a and the second fastener opening 56b and positioned to align with and receive the camera attachment portion 52f of the bracket 52 with the bracket 52 installed to the pedestal 50.

Figure 6:
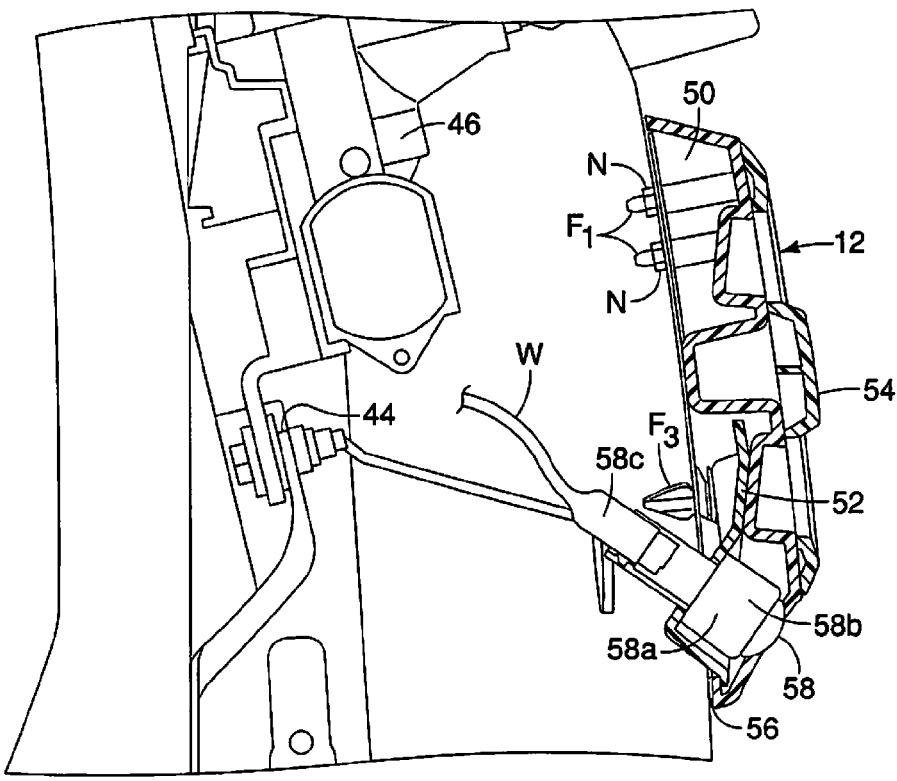
FIG. 6 is a cross-sectional view of the rear door and the camera assembly taken along the line 6-6 is in FIG. 1 in accordance with the first embodiment.

The camera 58 is a conventional video camera configured to capture video images and transmit them to the controller (not shown). As shown in FIG. 8, the camera 58 includes a housing 58a, a lens 58b and a connector portion 58c. The housing 58a includes openings that receive the fasteners $F_4$ in order to retain the camera 58 to the camera attachment portion 52f of the bracket 52. Once installed to the bracket 52 and the bracket 52 is installed to the pedestal 50, the lens 58b aligns with the lens receiving opening 50d of the pedestal 50 and the connector portion 58c extends through the camera receiving opening 52p of the camera attachment portion 52f of the bracket 52. More specifically, once fully installed, the camera 58 is basically retained between the bracket 52 and the pedestal 50 with the lens 58b being aligned with the lens receiving opening 50d of the pedestal 50. A wiring harness W (shown in FIG. 6) attaches to the connector portion 58c of the camera 58. As shown in FIG. 6, the wiring harness W extends into a space defined within the rear door 26 where it is connected to another wiring harness (not shown) and to the controller (not shown) of the video system (not shown) within the vehicle 10.

The camera assembly 12 is assembled in a manner consistent with the following basic steps. First, the camera 58 is fitted to the bracket 52, with the connector portion 58c extending through the camera receiving opening 52p. Next, the fasteners $F_4$ are inserted through the openings 52r and threaded into the openings in the housing 58a of the camera 58. Next, the lower flange portion 52h is inserted into the recess 50g of the pedestal 50, and pivoted about the lower flange portion 52h until the alignment posts 50m align with and are inserted into the alignment openings 52m in the upper flanges portion 52c of the bracket 52. Thereafter, the fasteners $F_2$ are inserted into the openings 52n in the side flange portions 52d of the bracket 52, and then threaded into the openings 50j in the pedestal 50. Installation of the bracket 50 and the camera 58 to the pedestal 50 is therefore complete. The emblem 54 can be installed to the pedestal 50 at any time during the assembly and installation process by inserting the projections 54b and 54c into the openings 50k in the pedestal 50.

Once the bracket 52 and camera 58 are installed to the pedestal 50, the camera assembly 12 can be installed to the rear door 26 of the vehicle 10. Prior to installation, the fasteners $F_1$ are installed to the openings 50i of the pedestal 50. In the depicted embodiment, the fasteners $F_1$ are threaded fasteners with differing threads at each end thereof. One end of the fasteners $F_1$ is provided with threads that threadedly engage the openings 50i of the pedestal 50. The ends of the fasteners $F_1$ that install to the rear door 26 includes machine threads onto which threaded nuts N (FIG. 6) are threaded thereby securing the camera assembly 12 to the rear door 26.

Also prior to installation, the snap-fitting fastener $F_3$ is inserted into the slot 52o of the fastener attachment portion 52e of the bracket 52 as shown in FIGS. 18 and 19.

Once the fasteners $F_1$ and the snap-fitting fastener $F_3$ are installed to the camera assembly 12, the seal 56 can be placed over the peripheral edge of the lip 50c. Once installed to the pedestal 50, the fasteners $F_1$ extend through corresponding ones of the first fastener openings 56a and the snap-fitting fastener $F_3$ extends through the second fastener opening 56b. Further, the connector portion 58c of the camera 58 extends through the camera opening 56c. Once installed to the pedestal 50, the seal 56 overlays the entire peripheral end of the lip 50c of the pedestal 50. Further, the seal 56 overlays the seal lip 52g of the camera attachment portion 52f of the bracket 52.

With the seal 56 installed to the camera assembly 12, the camera assembly 12 can be installed to the rear door 26 of the vehicle 12. During installation, the wiring harness W is inserted through the camera cable opening 42 in the outer main panel 30 of the rear door 26. Then the fasteners $F_1$ are inserted into the attachment apertures 40 in the rear door 26. As the camera assembly 12 is pushed into position against the rear door 26, the snap-fitting fastener $F_3$ inserts into the final attachment aperture 40 in the rear door 26 and is installed by pressing the camera assembly 12 into final position. Thereafter, threaded nuts N are threaded onto the ends of the fasteners $F_1$ completing the installation of the camera assembly 12, as shown in FIG. 6.

Figure 7:
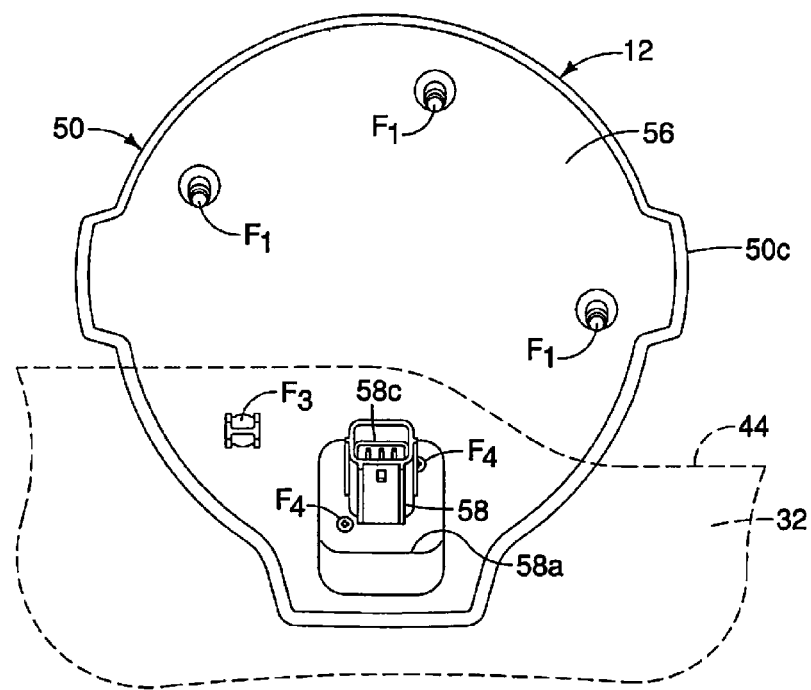
FIG. 7 is a rear view of the camera assembly showing an edge of the irregularly shaped opening of the rear door of the vehicle in accordance with the first embodiment.

FIG. 7 is a representation of the camera assembly 12 installed to the rear door 12 with the outer main panel 30 removed, but showing the inner main panel 32 in position relative to the camera assembly 12. As shown in FIG. 7, the inner main panel 32 covers the area around the opening in the outer main panel 30 that receives the snap-fitting fastener $F_3$. Since the inner main panel 32 conceals the opening that receives the snap-fitting fastener $F_3$ it is difficult for a technician to gain access to that portion of the outer main panel 30. Hence, the use of the snap-fitting fastener $F_3$ provides a convenient way to install the camera assembly 12.

As shown in FIG. 5, with the rear windshield wiper motor assembly 46 removed, the three openings that receive the fasteners F1 are fully exposed and can easily be accessed by a technician installing the camera assembly 12.

Once the camera assembly 12 is installed to the rear door 26, the seal 56 is securely held between the camera assembly 12 and the rear door 12. The seal 56 overlays a corresponding portion of the outer surface 30a of the outer main panel 30 of the rear door 26. The seal 56 is also disposed over the interior surface 50a of the pedestal 50, sealing the overall concave area 50e and protecting the camera 58. Further, the seal 56 contacts the peripheral edge 52s of the seal lip 52g, which presses a corresponding portion of the seal 56 into engagement with the portion of the outer surface 30a of the outer main panel 30 of the rear door 26 surrounding the camera cable opening 42. Thus, the camera cable opening 42 is provided with a second level of sealing protection to prevent environmental elements from entering the interior of the rear door 25 and protect the connector portion 58c of the camera 58.

Second Embodiment

Figure 20:
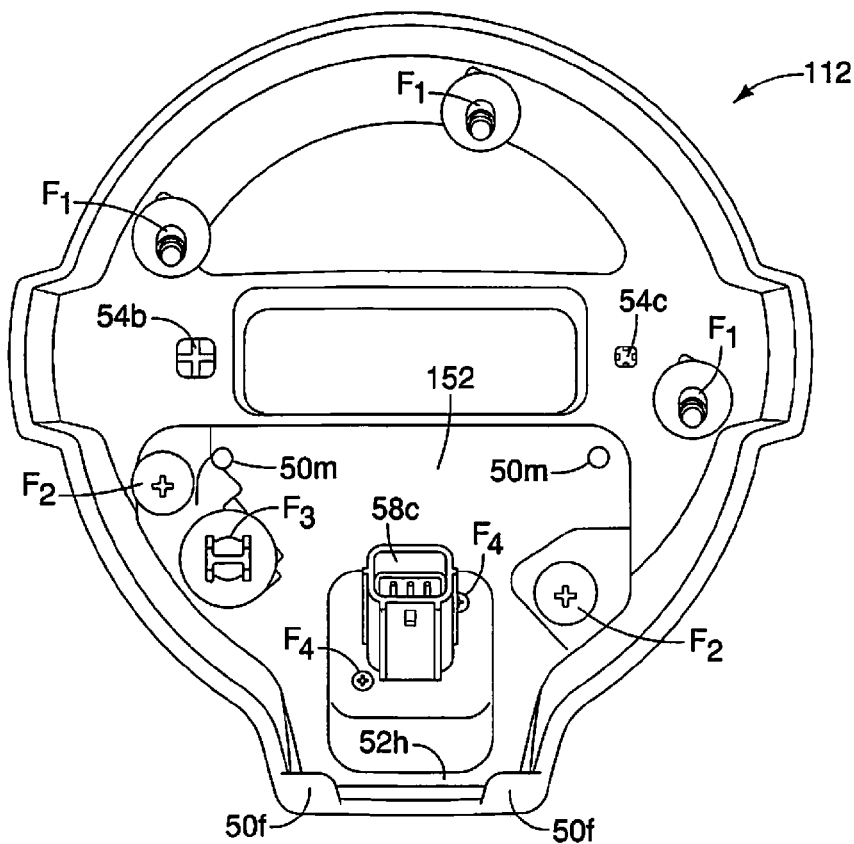
FIG. 20 is an elevational view of another camera assembly with the seal removed showing the camera attached to a modified bracket that is installed to the interior surface of the pedestal in accordance with a second embodiment.
Figure 21:
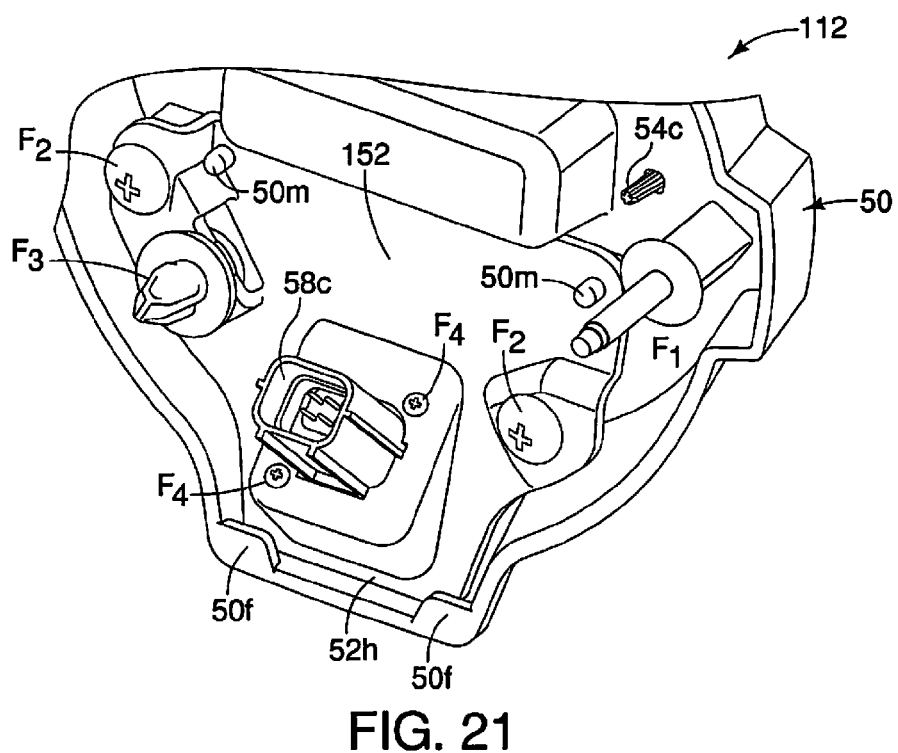
FIG. 21 is a perspective view of a lower portion of the camera assembly of FIG. 20 showing the camera attached to the bracket and the bracket installed to the interior surface of the pedestal in accordance with the second embodiment.

Referring now to FIGS. 20 and 21, a camera assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The camera assembly 112 includes many of the features of the camera assembly 12 of the first embodiment. Specifically, the camera assembly 112 includes the pedestal 50, and the camera 58. However, in the second embodiment the bracket 52 is modified defining a bracket 152. The bracket 152 includes all of the features of the bracket 52, except that one of the openings that receives the fastener $F_2$ is relocated upward and outward, corresponding to the location of a fastener $F_{2a}$, as shown in FIGS. 20 and 21. Further, the slot 52o in the flange 52e of the bracket 52 of the first embodiment is moved to a lower and more inboard location with the fastener $F_3$ installed therein, as is also shown in FIGS. 20 and 21. Further, in the second embodiment, the seal lip 52g is omitted. Otherwise, the camera assembly 112 and the camera assembly 12 have all the same features.

The various elements and features of the vehicle 10 other than the camera assembly 12 are conventional components that are well known in the art. Since these elements and features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle camera assembly. Accordingly, these terms, as utilized to describe the present invention should be interpreted relative to a vehicle equipped with the vehicle camera assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in other embodiments. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle camera assembly comprising:
a pedestal having an interior surface and an exterior surface with a lens receiving opening extending from the interior surface to the exterior surface, the interior surface including a bracket attachment structure having at least one projection extending from the interior surface such that a recess is defined between a portion of the interior surface and the at least one projection;
a bracket having a first surface, a second surface opposite the first surface with an outer peripheral edge that completely encircles an outer periphery of the bracket, the outer peripheral edge extending from the first surface to the second surface, the bracket being attached to the bracket attachment structure with a portion of the outer peripheral edge of the bracket, a portion of the first surface and a portion of the second surface being retained within the recess with the portion of the second surface facing and contacting the projection and the first surface facing the interior surface of the pedestal;
a camera retained between the bracket and the pedestal, the camera having a lens portion that is aligned with the lens receiving opening of the pedestal;
an emblem attached to the exterior surface of the pedestal and is spaced apart from the lens receiving opening.

2. The vehicle camera assembly according to claim 1, wherein
the bracket attachment structure includes at least one fastener receiving opening with a fastener attaching the bracket to the pedestal.

3. The vehicle camera assembly according to claim 2, wherein
the bracket attachment structure further includes at least one alignment pin that extends through an alignment aperture in the bracket.

4. The vehicle camera assembly according to claim 1, wherein
the bracket attachment structure includes a second projection defined between a second portion of the interior surface and the second projection, with a second portion of the outer peripheral edge of the bracket, a second portion of the first surface and a second portion of the second surface being retained within the second recess between the second projection and the second portion of the interior surface, with the portion of the second surface facing and contacting the second projection.

5. The vehicle camera assembly according to claim 1, wherein
the exterior surface has an overall convex shape and the interior surface has an overall concave area.

6. The vehicle camera assembly according to claim 5, wherein
the pedestal includes a lip that extends around an outer periphery thereof, the lip and the interior surface defining the overall concave area.

7. The vehicle camera structure according to claim 5, further comprising
a seal member disposed over the interior surface of the pedestal sealing the overall concave area.

8. The vehicle camera structure according to claim 7, wherein
the interior surface of the pedestal includes a vehicle fastening structure that attaches to a vehicle body structure via a mechanical fastener, and
the bracket is configured to attach to the vehicle body structure via a snap-fitting projection, with both the snap-fitting projection and the mechanical fastener extending through corresponding apertures in the seal member.

9. The vehicle camera assembly according to claim 1, wherein
the bracket includes a flange portion and a concave portion.

10. The vehicle camera assembly according to claim 9, wherein
the camera extends into the concave portion of the bracket and the flange portion includes at least one fastener receiving aperture with a fastener extending therethrough attached to the bracket attachment structure of the pedestal.

11. The vehicle camera assembly according to claim 10, wherein
the interior surface of the pedestal includes a mechanical fastener, and the flange portion of the bracket includes a snap-fitting projection.

12. A vehicle camera structure comprising:
a vehicle body structure having an outer body surface that includes a pedestal fastening structure and a bracket fastening structure;
a pedestal having an interior surface and an exterior surface with a lens receiving opening extending from the interior surface to the exterior surface, the interior surface including a bracket attachment structure and a vehicle fastening structure attached to the pedestal fastening structure;
a bracket directly attached to the bracket attachment structure of the pedestal via at least a first fastener and directly attached to the bracket fastening structure of the vehicle structure via a second fastener; and
a camera retained between the bracket and the pedestal, the camera having a lens portion that is aligned with the lens receiving opening of the pedestal.

13. The vehicle camera structure according to claim 12, wherein
the bracket attachment structure includes at least one alignment pin that extends through an alignment aperture in the bracket and at least one fastener receiving opening.

14. The vehicle camera structure according to claim 13, wherein
the bracket has a first surface, a second surface opposite the first surface with an outer peripheral edge that completely encircles an outer periphery of the bracket, the outer peripheral edge extending from the first surface to the second surface,
the bracket attachment structure further includes at least one projection extending from the interior surface such that a recess is defined between a portion of the interior surface and the at least one projection, with one edge of the bracket being retained within the recess, and
a portion of the outer peripheral edge of the bracket, a portion of the first surface and a portion of the second surface are retained within the recess with the portion of the second surface facing and contacting the projection and the first surface facing the interior surface of the pedestal.

15. The vehicle camera structure according to claim 12, further comprising
a seal member disposed between the pedestal and the outer body surface of the vehicle body structure.

16. The vehicle camera structure according to claim 12, further comprising
an emblem attached to the exterior surface of the pedestal and is spaced apart from the lens receiving opening.

17. The vehicle camera structure according to claim 12, wherein
the exterior surface of the pedestal has an overall convex shape and the interior surface of the pedestal has an overall concave shape, and
the pedestal includes a lip that extends around an outer periphery thereof, the lip and the interior surface defining the overall concave shape.

18. The vehicle camera structure according to claim 17, further comprising
a seal member disposed between lip of the pedestal and the outer body surface of the vehicle body structure.

19. The vehicle camera structure according to claim 12, wherein
the bracket includes a flange portion and a concave portion with the camera extending into and being retained within concave portion of the bracket.

20. The vehicle camera structure according to claim 18, wherein
- the vehicle fastening structure of the pedestal is attached to the pedestal fastening structure via a mechanical fastener that passes through a corresponding aperture in the seal member, and
- the bracket attaches to the bracket attachment structure of the pedestal via a snap-fitting projection that passes through a corresponding aperture in the seal member.

* * * * *